United States Patent
Shteinberg

(10) Patent No.: US 7,597,559 B2
(45) Date of Patent: Oct. 6, 2009

(54) METHOD OF IMITATING A NATURAL GEYSER AND A DEVICE FOR CARRYING OUT THE METHOD

(75) Inventor: Alexander Shteinberg, Berkeley, CA (US)

(73) Assignee: Alexander Shkolnik, San Carlos, CA (US)

( * ) Notice: Subject to any disclaimer, the term of this patent is extended or adjusted under 35 U.S.C. 154(b) by 462 days.

(21) Appl. No.: 11/647,362

(22) Filed: Dec. 29, 2006

(65) Prior Publication Data
US 2009/0011398 A1 Jan. 8, 2009

(51) Int. Cl.
G09B 23/40 (2006.01)

(52) U.S. Cl. ..................................... 434/299
(58) Field of Classification Search ............... 239/1, 239/22, 128; 434/126, 276, 299
See application file for complete search history.

(56) References Cited

U.S. PATENT DOCUMENTS

| | | | | |
|---|---|---|---|---|
| 2,619,377 A * | 11/1952 | Wilson et al. | | 239/17 |
| 3,484,045 A * | 12/1969 | Waters | | 239/22 |
| 3,673,705 A * | 7/1972 | Wright et al. | | 434/126 |
| 5,178,543 A * | 1/1993 | Semans et al. | | 434/218 |
| 5,277,585 A * | 1/1994 | Aminighazvini | | 434/126 |
| 6,039,570 A * | 3/2000 | Garner et al. | | 434/126 |
| 6,070,807 A * | 6/2000 | Kat et al. | | 239/1 |
| 6,254,396 B1 * | 7/2001 | Stevens | | 434/276 |
| 6,561,810 B1 * | 5/2003 | Schellhardt et al. | | 434/126 |
| 2005/0211805 A1 * | 9/2005 | Eddins et al. | | 239/589 |

FOREIGN PATENT DOCUMENTS

| EP | 1579899 | 9/2005 |
|---|---|---|
| RU | 461700 | 6/1994 |
| RU | 2015574 | 6/1994 |

* cited by examiner

Primary Examiner—Kurt Fernstrom

(57) ABSTRACT

A method and a device for imitating an artificial geyser that are simple and inexpensive in realization. The artificial geyser device comprises a sealed container located preferably underground in a shallow recess and filled with water. The container is provided with a heater for heating water to the level of boiling and with a common discharge pipe, one end of which is located in the container and can be adjusted with regard to the level of water while the opposite end extends to the atmosphere in the form of an eruption pipe with a supersonic nozzle on the output end. The common discharge pipe passes over the open ends of the U-shaped pipe arrangement. The device has a group of valves that selectively may change the direction of the eruption flow for passing to the atmosphere only through the common discharge pipe, only through the U-shaped arrangement, or through both simultaneously.

22 Claims, 4 Drawing Sheets

METHOD OF IMITATING A NATURAL GEYSER AND A DEVICE FOR CARRYING OUT THE METHOD

FIELD OF THE INVENTION

The invention relates to teaching aids visually illustrating natural phenomena. The invention may also be used as means for entertainment in parks, exhibitions, Disneyland-types of theme parks, etc. More specifically, the invention relates to a method of imitating a natural geyser and to a device for realizing the method.

BACKGROUND OF THE INVENTION

Known in the art is a method of imitating a natural geyser and a device for carrying out the method. Such a device consists of a geyser chamber located at a considerable depth under the surface of the ground (see USSR Inventor's Certificate No. 461700, A. G. Merzhanov, et al). The chamber is provided with a heater and a pipeline for the supply of cold water. Connected to the chamber is a vertical channel through which a mixture of boiling water and steam erupts. The upper end of the aforementioned channel is located on ground level or slightly above ground level.

In addition to the above-described method, in order to increase the amount of expelled water, it is known to arrange the input end of the geyser channel slightly below the level of the upper cover of the geyser chamber (see USSR Inventor's Certificate No. 2015574, U. I. Goldshleger, et al). As a result, when water begins to boil, the amount of steam formed in the process constantly grows and, in the initial period, does not have an exit from the chamber. The steam develops pressure in the direction of the water surface, and this pressure begins to expel nonboiling water through the channel. Hydraulic resistance to advancement of water in the channel assists in increasing pressure and temperature in the chamber. After the level of water in the chamber drops to the input end of the geyser channel, the latter begins to receive a significant amount of steam. Pressure in the geyser quickly drops, and eruption is initiated.

A common disadvantage of both methods and devices of the type described above is that the chamber and heaters are located deep underground, i.e., much below the outlet end of the geyser channel. Diameters of chambers even of small artificial geysers should be of the order of several meters. Therefore, construction of such chambers at a significant depth from ground level is a very time- and labor-consuming process. The drilling of wells of such diameter is very expensive even at an insignificant depth. No less complicated is subsequent placement of geyser chambers in the aforementioned wells. The chambers of such artificial geysers are special boilers that are provided with powerful heaters (burners or electric heaters) and temperature and pressure measurement instruments for controlling temperature and pressure in the boiler. For these reasons, artificial geysers have not been created until now in spite of their principle simplicity and efficient imitation of a natural geyser in combination with their cognitive value. Artificial geysers have not yet been demonstrated either in parks, schools, or Disneyland-type facilities. Small-scale geyser models that are demonstrated in the San Francisco polytechnic museum known as the Exploratorium, possess insignificant power and are characterized by a very low height of eruption (about 1 meter). Therefore, such models practically do not imitate the process of a natural geyser, and their structure consists merely of a chamber and a tube.

SUMMARY

It is an object of the present invention to provide a method for imitating an artificial geyser that is simple and inexpensive in its realization. Another object is to provide a device for realizing the above method that is located completely underground, except for the eruption pipe. Another object is to provide an artificial geyser that does not require creation of a deep underground geyser chamber that is inexpensive to manufacture, simple in construction, and efficient in imitating a natural geyser eruption. It is another object to provide an adjustable artificial geyser system of a universal type that operates in various modes of eruption.

According to one embodiment of the invention, a method for imitating a natural geyser eruption consists of heating a liquid, preferably water, in a closed cavity, preferably in an underground container, until steam forms, and then displacing the mixture of water with steam from the system of pipes, including a U-shaped portion, to the atmosphere in the form of a natural geyser erupting from the system due to a rapid explosion-like development of pressure in the pipeline system. The artificial geyser device comprises the following: a closed cavity filled with water; a heating device for heating the water; a feeding pipeline for the supply of water to the cavity, a U-shaped pipe arrangement, one branch of which forms a downward-directed descending pipe and another branch of which forms an upward-directed geyser channel; and a common discharge pipe with a device for adjusting the depth of immersion of one end of the aforementioned common discharge pipe into the liquid of the cavity while the opposite end of the common discharge pipe exits to the surrounding atmosphere and is connected to the aforementioned U-shaped pipe arrangement. The device is provided with valves for switching the artificial geyser between various modes of eruption caused by redistribution of the flows in the system. In order to ensure the maximum height of eruption, the outlet end of the eruption pipe is provided with a supersonic Laval nozzle.

DETAILED DESCRIPTION OF THE INVENTION

Construction of the Artificial Geyser with a U-shaped Geyser Channel

Figure 1:
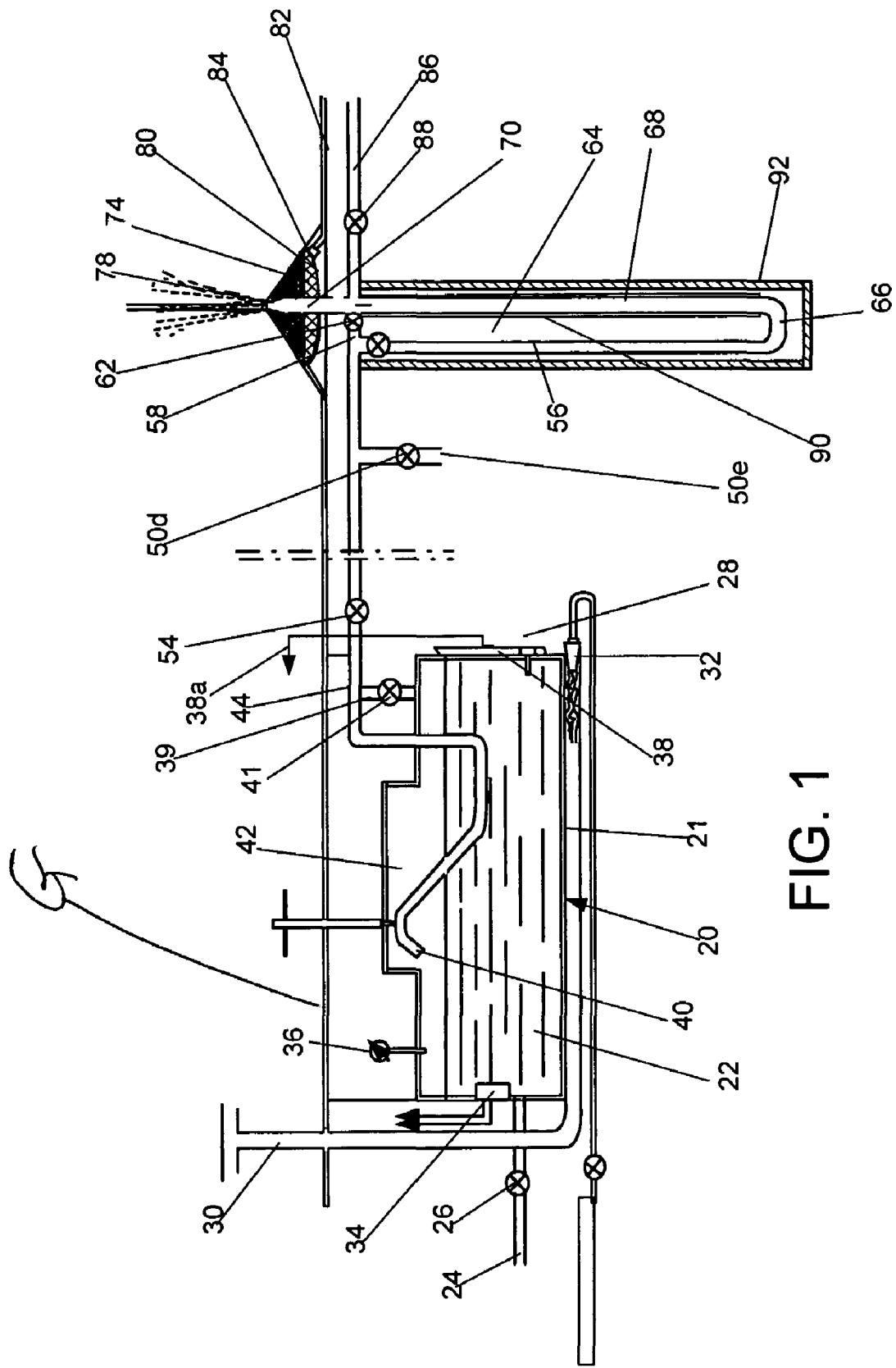
FIG. 1 is a schematic sectional view of an artificial geyser of the invention.

As shown in FIG. 1, which is a schematic sectional view of an artificial geyser of the invention (hereinafter referred to as "artificial geyser"), the artificial geyser contains a geyser chamber 20 (a boiler) that is intended for heating and boiling the content of the chamber. The geyser chamber 20 may comprise a sealed container 21 located either in a small shallow recess excavated in the ground or installed on the ground surface. In FIG. 1, the ground level is designated by the letter G. The geyser chamber 20 is filled with water 22 which can be heated by products of burning a natural fuel that may be in a gaseous, liquid, or solid form.

Cold water is supplied to the geyser chamber 20 by means of a pipeline 24 that has a check valve 26. Burning of a mixture of a gaseous or liquid fuel with water is carried out with the use of a burner 28, while the products of burning, which are cooled after contact with the heating surface of the geyser chamber 20, are exhausted to the atmosphere by means of a fire smoke tube 30. Similar to conventional steam boilers and water heaters that operate with increased pressure of steam, the geyser chamber 20 is equipped with temperature-control devices such as a thermocouple 32, a thermometer 34, a manometer 36, a water-level meter 38, etc. Reference numeral 41 designates a steam boiler valve installed in a steam pipe 39, and reference numeral 38a shows a line that transmits the data of the water-level meter 38 to a remote location.

Figure 2:
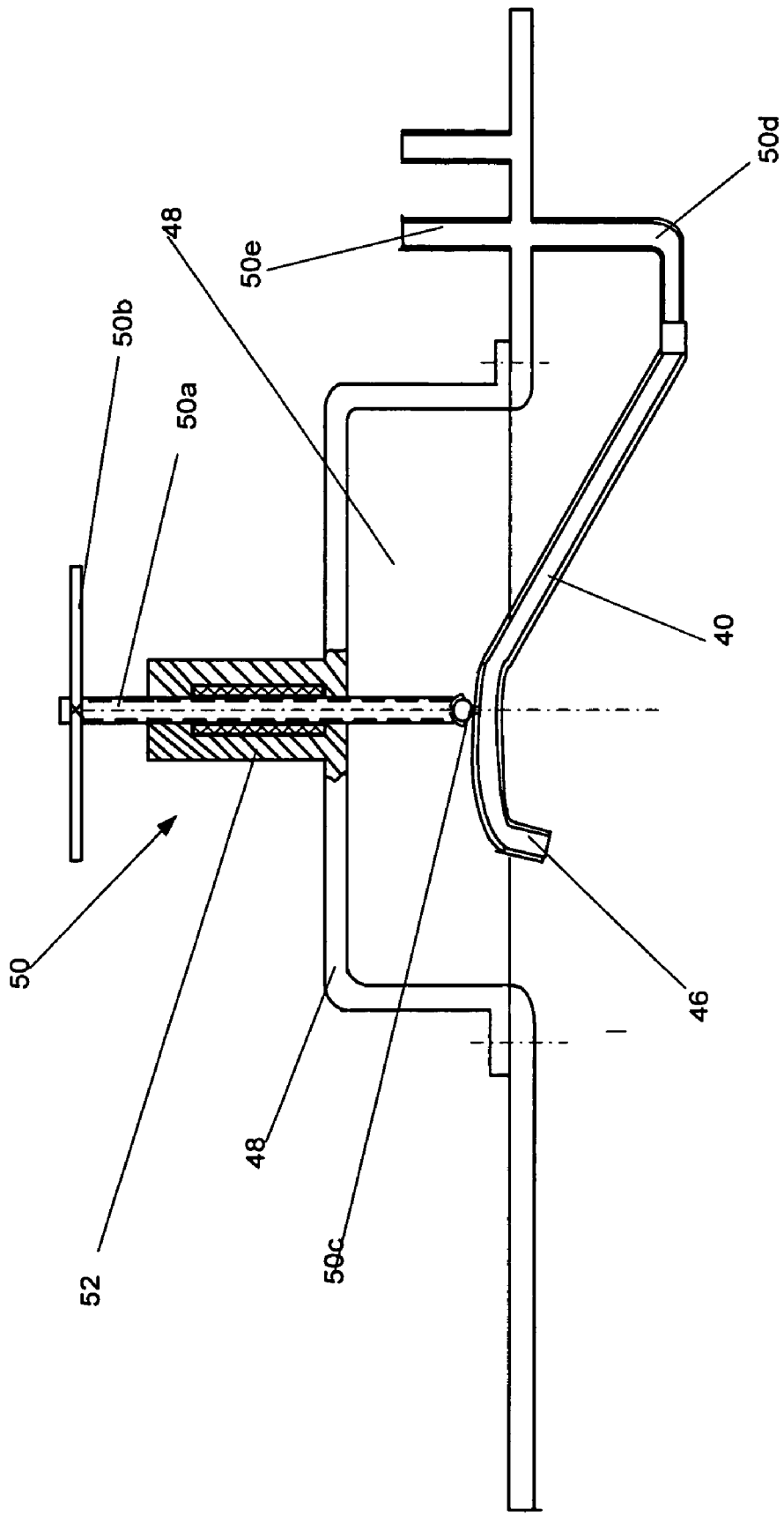
FIG. 2 is a schematic sectional view that illustrates arrangement of the input pipe in the geyser chamber of the geyser in FIG. 1.

Hot water and a mixture of water with steam are discharged from the geyser chamber 20 by means of an outlet pipe section 40 (FIGS. 1 and 2) that is located in portion 42 of the geyser chamber 20 and is arranged above the water level. The outlet pipe section 40 is connected to one end of an addition pipeline 44, which is located beyond the geyser chamber 20. Adjustment in the position of the input end 46 (FIG. 2) of the outlet pipe section 40 relative to the level of water in the geyser chamber 20 is carried out with the use of an adjustment mechanism 50 that is connected to the outlet pipe section 40 (FIG. 2) and passes to the outside of the geyser chamber 20 by means of a sealing device 52 that makes it possible to adjust the position of the inlet end 46 of the outlet pipe section 40 without violating hermeticity of the geyser chamber 20. It should be noted in connection with the aforementioned adjustment mechanism 50 that in order to find the optimal operational conditions at which the artificial geyser provides the most powerful eruption, it is important to be able to adjust the vertical position of the inlet end 46 of the outlet pipe section 40 relative to the cover 48 of the geyser chamber 20. The aforementioned outlet pipe section 40 serves to take hot water and steam from the geyser chamber 20. The aforementioned adjustment mechanism 50 comprises a screw 50a, one end of which supports a handle 50b and another of which connects to the outlet pipe section 40 by means of a spherical bearing 50c. The screw 50a is threaded into an upper wall of a pipe unit that is supported by the cover 48 of the geyser chamber 20. The sealing device 52 should be able to withstand high temperatures. It is understood that rotation of the screw 50a moves the outlet pipe section 40 in the vertical direction and thus changes the position of the inlet end 46 relative to the level of water in the geyser chamber 20. As shown in FIG. 2, the pipe section 40 is connected by means of a section 50d to a pipe 50e (FIGS. 1 and 2). If necessary, the pipe 50e can be used to supply compressed air to the geyser chamber 20.

The common discharge pipe 44 is provided with a heat-insulating coating (not shown). By means of a valve 54 (FIG. 1), the common discharge pipe 44 connects to a descending pipe section 56 that has a valve 60. The common discharge pipe also has a valve 62 installed in its bypass section between the descending pipe 56 and the geyser channel 68.

The descending pipe section 56 is located in a well 64. At the lowermost point 66, the descending pipe section changes to the opposite direction, turning into an ascending pipe section that goes upward and that terminates above ground level in the form of an outlet eruption pipe 70. In t geyser-related terminology, the ascending pipe, such as pipe 68, is known as "geyser channel". Therefore, hereinafter the pipe 68 will be referred to as the channel 68.

Thus, the descending pipe section 56 and the geyser channel 68 together form a continuous U-shaped arrangement 56-68.

The bypass pipe section 58 connects the portion of the common discharge pipe 44 that is located behind the descending pipe section 56 with the pipe 72 that supports the outlet eruption pipe 70. The pipe 72 is arranged in the center of a pool 74 that imitates a pool of water that is formed around a natural geyser and that is decorated by stones, plants, or the like. An explosion-like discharge of a water-and-steam mixture 76 at the eruption stage of the geyser operation is carried out through the outlet eruption pipe 70. Since in a two-phase medium that is represented by a mixture of water and steam the speed of sound is very low (30 to 40 m/sec), the height of eruption is relatively low and even in natural geysers does not exceed 20 to 25 meters. Therefore, in order to increase the height of eruption in the device of the invention, the outlet eruption pipe 70 is provided with a supersonic nozzle 78 of the type shown in FIG. 3. A preferable form of the nozzle 78 is a supersonic Laval nozzle for emitting a two-phase mixture of liquid and steam.

Figure 3:
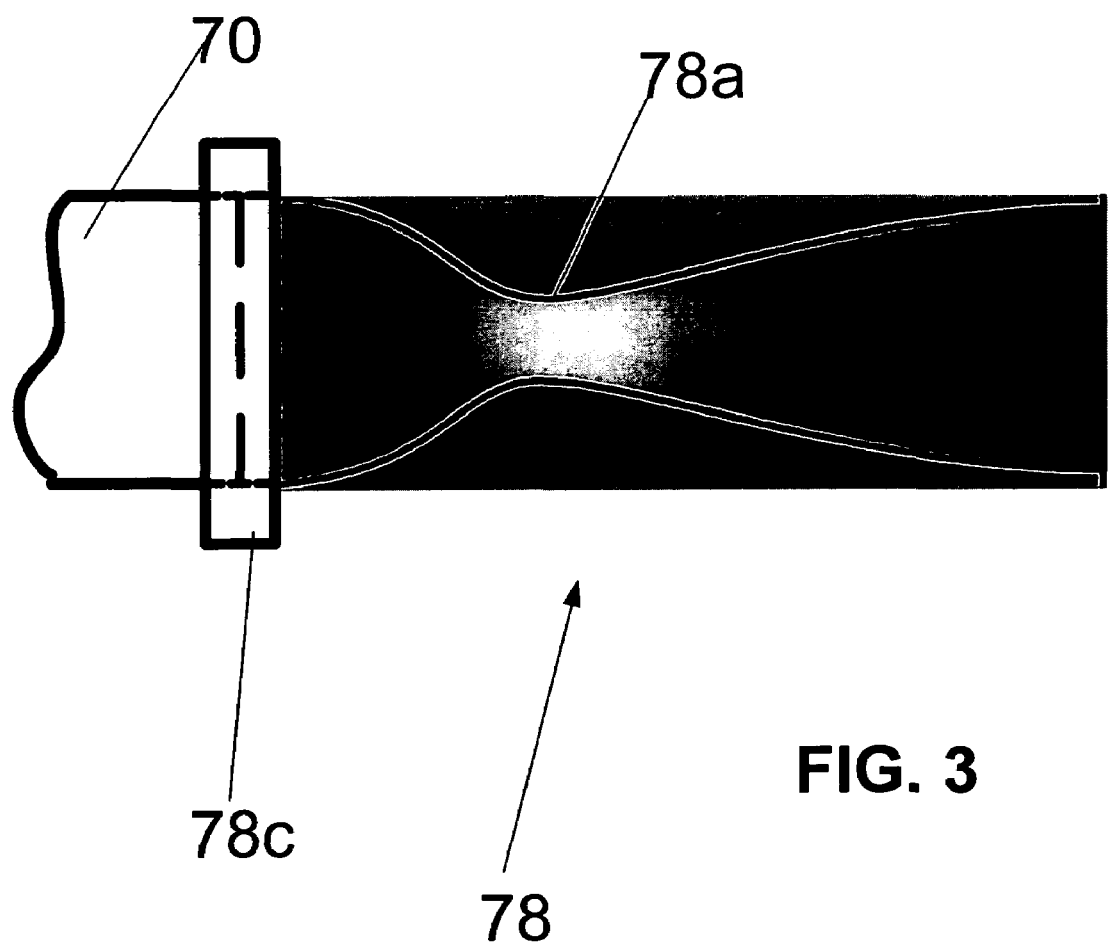
FIG. 3 is sectional view of a supersonic Laval nozzle installed on the eruption pipe of the device of the invention for emitting a two-phase mixture of water and steam.

As shown in FIG. 3, the supersonic Laval nozzle suitable for the artificial geyser of the invention is shaped like a conventional Laval nozzle in the form of a tube that has a narrowed portion 78a in the middle, forming an hourglass shape. This portion is used as a means of accelerating the flow of the steam-water mixture passing through the tube. This type of tube is widely used in some steam turbines and is an essential part of the modern rocket engine and supersonic jet engines.

Operation of the Laval nozzle relies on the different properties of gases flowing at subsonic and supersonic speeds. The speed of a subsonic flow of gas increases if the pipe carrying it narrows because the mass flow rate is constant (grams or pounds per second). The gas flow through a Laval nozzle is isentropic (gas entropy is nearly constant) and adiabatic (heat loss or gain is nearly zero). At subsonic flow the gas is compressible; sound or a small pressure wave will propagate through it. Near the nozzle "throat", where the cross-sectional area is a minimum, the gas velocity locally becomes transonic (Mach number=1.0), a condition called choked flow. As the nozzle cross-sectional area increases, the gas continues to expand, and the gas flow increases to supersonic velocities whereby a sound wave will not propagate backward through the gas as viewed in the rest frame of the nozzle (Mach number>1.0). In FIG. 3, reference numeral 70 designates the end of the outlet eruption pipe (FIG. 1) of the geyser channel. The nozzle 78 can be connected to the end of the pipe 70 by means of an elongated nut 78c.

The pool 74 has waterproofed walls 80 and is provided with a water-removal pipe 82 with a filter 84. The water-removal pipe 82 is connected to a sewage water system (not shown). This system ensures collection and removal of erupted water and maintains the water in the pool 74 at a constant level.

Connected to the geyser channel 68 near its outlet portion 74 is a cold-water delivery pipe 86 with a check valve 88. In order to reduce loss of heat, the pipe 56 and the geyser channel 68 can be coated with heat-insulating coatings 90, and for protection of these pipes from corrosion, the well 64 into which the pipe 56 and the geyser channel 68 are inserted has waterproofed walls 92.

Operation of the Artificial Geyser in First and Subsequent Cycles

Initiation of the Artificial Geyser Operation

Depending on the positions and conditions of the valves, initiation and operation of the artificial geyser shown in FIGS. 1 and 2 can be carried out in different modes. In all cases, filling of the system with cold water is an operation common for all modes. First, by means of open valves 26, 88, 60, and 54 (FIG. 1), cold water fills the chamber 20, the geyser channel 68, and pipes 44 and 56. After the filling with cold water is completed, the valves 26 and 88, as well as the main valve 54, of the geyser are closed. Following this, geyser chamber heaters are ignited. If the heaters operate on products of natural combustion, a liquid fuel is supplied to the burner 28 that has a pilot flame or another system of fuel-burning stabilization. Alternatively, heating can be carried out with the use of electric heaters (not shown). When water temperature and steam pressure in the geyser chamber 20 reach predetermined values, the geyser is ready to initiate the process of eruption.

In the initial position of the geyser prior to its initiation, the cold-water supply valves 88 and 26 are closed. The valves 54 and 62 of the bypass pipe 58 are also closed. The steam boiler valve is closed as well. The valve 60 of the descending pipe section 56 is open. The inlet end 46 of the outlet pipe section 40 is lowered below the heater level in the geyser chamber 20.

When the valve 54 opens under effect of the steam pressure formed in the geyser chamber 20 as a result of heating, water begins to move by means of the valves 54 and 60, which are now open, along the pipes 40, 44, and 56 and the geyser channel 68. At the beginning of this movement, pressure in the geyser chamber 20 drops insignificantly because the volume of the pipes 44 and 56 and channel 68 is much smaller than the volume of the geyser chamber 20. At this initial stage of geyser operation, the starting cold water that fills the pipe 56 and the channel 68 is gradually replaced by hot water. While moving toward the pipes 44 and 56 and channel 68 toward the exit, hot water experiences conditions of a continuous drop in pressure until the moment it starts to boil. The steam that is generated as a result of boiling gradually replaces a part of the water in the aforementioned pipes 44 and 56 and channel 68. The pressure drop that is required for moving the water-and-steam mixture is equal to ΔP:

$$\Delta P = P_1(T_1) - P\infty, \quad (1)$$

where $P_1$ is the pressure of steam in the geyser chamber 20; $T_1$ is the temperature of water in the geyser chamber 20; and $P\infty$ is atmospheric pressure.

For a general case, the dynamics of water movement in a pipe is described by the following equation:

$$M_1 d^2x/dt^2 = \Delta P S - \zeta \gamma (dx/dt)^2 d/2gL \quad (2)$$

where $m_1 = m_1(t)$ is the mass of water in the pipe that varies with time; S is the cross-sectional area of the pipe; d is the diameter of the pipe; L is the total length of the pipe portion filled with water; dx/dt is the speed of movement of the water-and-steam mixture; $d^2x/dt^2$ is acceleration of movement of the water-and-steam mixture; $\zeta$ is the coefficient of hydraulic resistance in the pipe; $\gamma$ is density of water; and g is free-fall acceleration.

Analysis of formula (2) shows that as the volumetric (mass) share of water in the pipelines of the geyser system decreases, the speed of movement of water and of the entire two-phase mixture constantly grows.

After the last portions of cold water leave the geyser system, the geyser begins to operate in the main eruption mode. In its mechanism and acoustic and visual effect in this stage, eruption of the artificial geyser is entirely similar to eruption of a natural geyser.

In its appearance, eruption of the artificial geyser of the invention differs from the operation of a fountain which silently ejects a stationary water jet having a diameter that expands with the height of the fountain. In contrast to this, operation of an artificial geyser is characterized by strictly periodic (as vulcanologists say, "spasmodic") and powerful low-frequency eruptions of a water-and-steam mixture. Such eruptions are accompanied by a specific crashing of the sonic spectrum that contains sounds specific to an explosive movement of a two-phase media (water and steam) in the range of infrasonic acoustic frequencies. Under these conditions, steam rises to a multimeter height in the form of puffs. At the eruption stage, the water portion of the two-phase mixture moves in the form of large drops that reach several centimeters in diameter, which is unusual for flight in a free state. At the stage of free fall, these drops disintegrate and are significantly cooled. Nevertheless, it is recommended that spectators do not get under this hot rain and they must be located at a sufficiently safe distance from the artificial geyser. The radius of such a "safety circle" corresponds approximately to the lift height of the water component of the geyser eruption.

Completion of the First Eruption

When the input end 46 (FIG. 2) of the outlet pipe section 40 appears to be essentially above the level of water in the geyser chamber 20, the metastable overheating of water in the geyser chamber rapidly decreases, and the geyser enters a conclusive stage of eruption in which the amount of steam in the mixture progressively increases. In natural geysers, the freed volume is rapidly filled with relatively cold underground water, and this accelerates completion of the geyser operation.

Similarly, in order to accelerate completion of eruption of the artificial geyser and to begin the next geyser cycle, the valves 26 and 88 are opened, and the parts of the geyser system which are free of hot water are gradually filled with cold water.

Upon completion of the filling operation, the valves 26, 88, and 54 are closed, and the above-described process is repeated, except that the initial temperature of water in the geyser chamber prior to supply of a new portion of cold water is close to 100° C. Therefore, in this mode, the duration of a normal geyser cycle is much shorter than the time spent for preparation of the first eruption.

Eruption by Using the U-shaped Portion 56-68 Formed by Pipe Section 56 and Channel 68

Mode 1

In this mode of operation of the geyser, the valve 62 of the bypass pipe 58 is closed. Prior to eruption, the valve 60 is opened, and the valve 54 is closed. When pressure and temperature in the geyser chamber 20 reach a predetermined level, the valve 54 is opened. Hot water flows along pipes 44 and toward the U-shaped portions 56 and 68. If the pipe 56 and channel 68 have been preliminarily filled with cold water, the cold water is first displaced through the nozzle 78 in the form of a conventional fountain. Further, the cold water contained in the aforementioned pipes is mixed with hot water received from the geyser chamber 20, whereby the water is heated and begins to boil. As a result, the pipelines are filled with a water-and-steam mixture.

When the flow of the mixture transfers to the so-called "bubble mode", the geyser channel is completely filled with bullet-shaped steam bubbles. Such a mode is a feature inherent in eruptions of natural geysers. Discontinuation of the eruption occurs in the same manner as described above in the section titled Initiation of the Artificial Geyser Operation.

Mode 2

In this mode of geyser eruption, the valve 62 of the bypass pipe 58 is closed. Prior to initiation of eruption, the valves 60 and 54 are opened. The valve 41 of the steam pipe 39 is also opened. The inlet end 46 of the outlet pipe section 40 is immersed into water of the geyser chamber 20. As water temperature and pressure in the chamber 20 increase, steam formed in the chamber 20 begins to move from the chamber 20 along the pipes 39 and 44 toward the pipe 56 and the channel 68. Partial condensation of steam in moving water layers that are in contact with the steam causes heating of the aforementioned layers, and this delays the condensation process. In any case, the pipe 44 and the channel 68 accumulate an increasing amount of steam, the pressure of which increases with the increase of pressure in the geyser chamber 20. Filling of the geyser channel 68 with steam is accompanied by displacement of water from this channel. After the first portions of the steam break through from the pipe 56 to the channel 68 through the lowermost point 66 of the U-shaped portion 56-68, the drop of pressure in the geyser chamber 20 is accelerated and is accompanied by an explosion-like process of eruption. In this case, the main part of water and steam move along the pipe 9. The above-described mode is ensured by condition of the valve 41, which is adjusted to hydraulic pressure significantly higher than hydraulic resistance of the pipe section 40.

Discontinuation of the eruption occurs in the same manner as described above in the section titled Initiation of the Artificial Geyser Operation.

Mode 3

In this mode, the eruption process develops in a manner similar to the process described in Mode 2. The only difference is that during filling of the geyser chamber 20 and the U-shaped portion 56-68 with cold water, compressed air can be fed to the pipe 44 by means of the open valve 57$d$ from the pipe 50$e$. Penetration of air to the gaseous volume of the geyser chamber 20 causes development of the eruption process to be more stable. Provision of an "air piston" between the "steam pillow" of the geyser chamber 20 and the initial cold water in the descending pipe section 56 protects the latter from penetration of steam and steam condensate during the increase in temperature and pressure in the geyser chamber 20. Therefore, the increase of pressure in the chamber 20 is accompanied by synchronous decrease of the water level in the descending pipe section 56. The eruption begins when the first portions of gas break through the lowermost point 66 of the U-shaped portion 56-68 to the geyser channel 68.

Eruption with Use of Only the Upper Part of Channel 68

In all stages of the process, including supply of cold water to the geyser chamber 20 and the eruption stage, the valve 62 of the bypass pipe 58 remains open, while the valve 88 is closed. In the stage of heating water and increasing pressure in the geyser chamber 20, the valve 54 remains closed. After the water temperature and steam pressure reaches predetermined values, the valve 54 is opened. Hot water begins to flow from the chamber 1 by means of the pipe 10 and the bypass pipe 58 to the outlet eruption pipe 70 and then to the nozzle 78. The drop of pressure in the chamber 20 causes boiling of water in the geyser chamber 20 and in the pipes 44 and 70.

An eruption has an explicitly explosive nature, and the intensity of an eruption depends mostly on the degree and speed of opening the valve 54, as well as on the initial pressure $P_0$ and temperature $T_0$ in the chamber 20 and on the initial position of the inlet end 46 of the outlet pipe section 40 in the chamber 20. The higher the pressure $P_0$ and temperature $T_0$ and the faster the valve 54 is opened, the higher is the intensity of the eruption. The eruption is completed spontaneously when pressure and temperature in the chamber drop to predetermined values close to $P=P\infty=1$ atm and $T_0=100°$ C. However, if necessary, the eruption can be stopped positively by closing the valve 54. In order to demonstrate various modes of initiation, progress, and completion of the eruption inherent in various natural geysers, duration of the eruption process and speed of opening of the aforementioned valve at the initial period of eruption can be adjusted by the operator.

When filling the chamber 20 with a new portion of cold water, during the eruption the pressure in the chamber should be reduced to a level below the pressure of water in the feeding pipe connected to the chamber 20 through the check valve 26.

Automatic Operation of the Geyser

The use of the descending pipe section 56 and the geyser channel 68 that together form a continuous U-shaped portion 56-68 makes it possible to provide multiple cyclic eruptions of the artificial geyser in an automatic mode, i.e., without participation of an operator.

In this mode, the valve 54 is constantly open. When pressure in the chamber 20 drops below the pressure of cold water in the cold-water supply pipe 24, the cold-water supply check valve 26 opens automatically. When the pressure increases to a predetermined level, the valve 26 closes.

In this mode, eruption of the artificial geyser occurs in the following manner. The descending pipe section 56 and the geyser channel 68 of the continuous U-shaped portion 56-68 are filled with water from the pipe 86 which is provided with the check valve 88 that operates similar to the check valve 26. The state of the valve 41 of the steam pipe 39 and of a position of the inlet end 46 of the outlet pipe section 40 are the same as described in Mode 2. As water is heated and begins to boil in the geyser chamber 20, the steam bubble ("piston") in the upper part of the descending pipe section 56 grows. Continuing increase of pressure in the chamber 20 maintains the growth of the pressure drop in the communicating vessels, i.e., in the descending pipe section 14, the upper part of which is filled with vapor and the lower part of which is filled with water, and in the channel 68 filled with water. After the breakthrough of steam from the descending pipe section 56 to the channel 68, the water contained in the channel 20 appears to be under a metastable overheating condition. In this condition, the overheated water begins to boil in the chamber 20, in the pipes 44 and 56, and in the channel 68. The boiling process is accompanied by spasmodic eruptions of the two-phase mixture through the nozzle 78. The eruption discontinues spontaneously because of a pressure drop in the chamber 20. Pressure in the chamber 20 drops for the following two reasons: (1) transfer of heat (potential) energy of the overheated water in the chamber 20 to kinetic energy of the two-phase mixture erupts through the nozzle 78, and (2) supply of new portions of cold water to the chamber 20 through the valve 26 from the cold-water supply pipe 24, which occurs when pressure in the chamber 20 becomes lower than pressure in the cold-water supply pipe 24. After the chamber 20 is filled to the required level, the valve 26 is closed.

Figure 4:
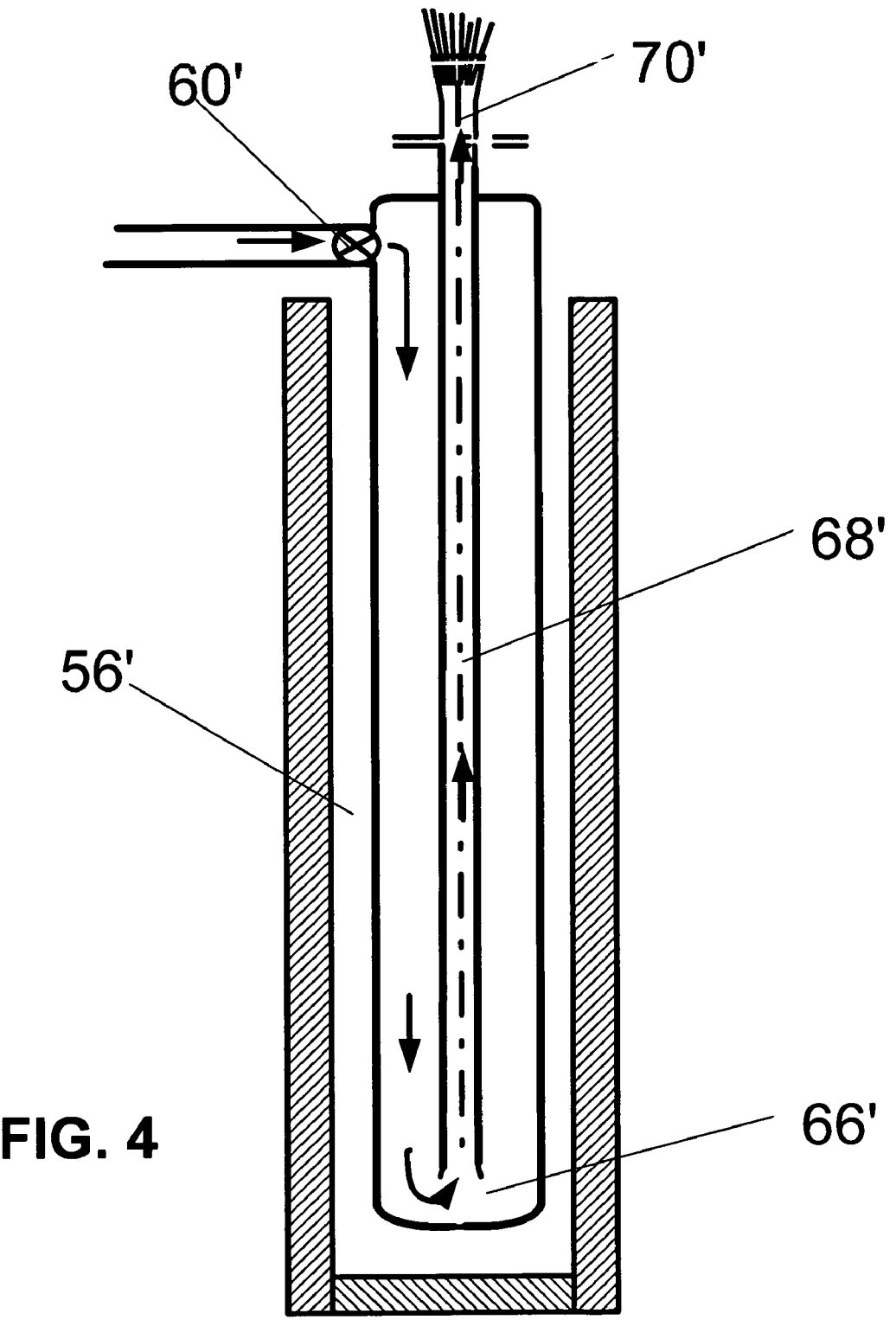
FIG. 4 is a sectional view of the U-shaped portion of the pipeline of the invention wherein a geyser channel is arranged coaxially inside an outer descending pipe.

Embodiment of the Artificial Geyser with a Geyser Channel Formed by Coaxial Tubes The principle of the invention will not be violated if the U-shaped configuration of the underground geyser channel formed by the pipe 56 and the geyser channel 68 is replaced by a coaxial pair of tubes, shown in FIG. 4, where a geyser channel 68' is arranged coaxially inside an outer descending pipe 56$a'$. The rest of the device and the principle of operation are the same as in the previously described embodiment. In FIG. 4, reference numeral 60' corresponds to the valve 60, and 70' to the outlet eruption pipe 70 shown in FIG. 1. A point 66' is the lowermost point of the descending pipe 56'.

Thus, it has been shown that the present invention provides a method for imitating an artificial geyser that is simple and inexpensive in its realization. The invention also provides an artificial geyser for realization of the above method that does not require creation of a deep underground geyser chamber and that is inexpensive to manufacture, simple in construction, and efficient in imitation of a natural geyser eruption. It is another object to provide an artificial geyser system of a universal type that can operate in different modes of eruption.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the container with water is not necessarily located underground and can be placed above the ground, e.g., in a building. In the embodiment with concentric pipes, the descending pipe may be located inside the geyser channel. The liquid is not necessarily water. The liquid can be heated by means of heaters different from those shown and mentioned in the specification. The system can be equipped with various electronic sensors that indicate the level of the liquid and all other controlled parameters, such as pressure, temperature, etc., remotely in digital form on a display screen located in a control room. The artificial geyser operation can be controlled automatically by means of a program. The erupted liquid can be illuminated by white or color light beams. The eruption sounds can be acoustically amplified.

The invention claimed is:

1. A method for imitating a natural geyser eruption comprising the steps of:
    providing an apparatus comprising a closed cavity filled with a liquid, a heating device for heating the liquid, a feeding pipeline for the supply of liquid to the cavity, a U-shaped pipe arrangement one branch of which forms a downward-directed descending pipe and another branch of which forms an upward-directed geyser channel, and an additional pipe line with a device for adjusting the depth of immersion of one end of the aforementioned common discharge pipe into the liquid of the cavity while the opposite end of the common discharge pipe exits to the surrounding atmosphere in the form of an eruption pipe and is connected to the aforementioned U-shaped pipe arrangement;
    heating the liquid in the aforementioned cavity until formation of steam of said liquid;
    continuing heating the liquid for increase of pressure in the cavity, for mixing the liquid with the steam of said liquid, and for displacing the mixture of liquid and steam of said liquid from the addition pipeline through the U-shaped pipe arrangement to the atmosphere in the form of a natural geyser erupting to the atmosphere through the eruption pipe due to a rapid explosion-like development of pressure in the cavity, the common discharge pipe, and the U-shaped pipe arrangement.

2. The method of claim 1, further comprising the step of providing the apparatus with valves capable of redistributing the liquid and steam of said liquid for flowing to the atmosphere through the common discharge directly to the eruption pipe beyond the U-shaped pipe arrangement, through the common discharge pipe to the eruption pipe through the U-shaped pipe arrangement, or through both the common discharge pipe directly to the eruption pipe and through the common discharge pipe to the eruption pipe through the U-shaped pipe arrangement simultaneously.

3. The method of claim 1, further comprising the step of providing the eruption pipe with a supersonic nozzle.

4. The method of claim 3, wherein the supersonic nozzle is a Laval nozzle for a mixture of liquid and steam of said liquid.

5. The method of claim 2, further comprising the step of providing the eruption pipe with a supersonic nozzle.

6. The method of claim 5, wherein the supersonic nozzle is a Laval nozzle for a mixture of liquid and steam of said liquid.

7. The method of claim 1, wherein the aforementioned liquid is water.

8. The method of claim 2, wherein the aforementioned liquid is water.

9. The method of claim 4, wherein the aforementioned liquid is water.

10. An apparatus for imitation of a natural geyser eruption comprising a:
    closed cavity filled with a liquid and having a steam space above the liquid;
    heating device for heating the liquid;
    feeding pipeline for the supply of the liquid to the cavity;
    U-shaped pipe arrangement one branch of which forms a downward-directed descending pipe and another branch of which forms an upward-directed geyser channel;
    common discharge pipe with a device for adjusting the depth of immersion of one end of the aforementioned common discharge pipeline into the liquid of the cavity while the opposite end of the common discharge pipe exits to the surrounding atmosphere in the form of an eruption pipe and is connected to the aforementioned U-shaped pipe arrangement, and a
    steam pipe between the stream space and the common discharge pipe.

11. The apparatus of claim 10, wherein the closed cavity comprises a sealed container located underground.

12. The apparatus of claim 11, further comprising a group of valves capable of redistributing the liquid and steam of said liquid for flowing to the atmosphere through the common discharge pipe directly to the eruption pipe beyond the U-shaped pipe arrangement, through the common discharge pipe to the eruption pipe through the U-shaped pipe arrangement, or through both the common discharge pipe directly to the eruption pipe and the common discharge pipe to the eruption pipe through the U-shaped pipe arrangement simultaneously.

13. The apparatus of claim 12, further comprising an eruption pipe with a supersonic nozzle on the end of the common discharge pipe that projects to the surrounding atmosphere.

14. The apparatus of claim 13, wherein the supersonic nozzle is a Laval nozzle for a mixture of liquid and steam of said liquid.

15. The apparatus of claim 10, wherein the U-shaped pipe arrangement consists of a descending tube and a geyser channel and wherein the U-shaped pipe arrangement is selected from the group consisting of an arrangement wherein the descending tube is connected to the geyser channel in series and an arrangement where the geyser channel is concentrically located inside the descending tube.

16. The apparatus of claim 12, wherein the U-shaped pipe arrangement consists of a descending tube and a geyser channel and wherein the U-shaped pipe arrangement is selected from the group consisting of an arrangement wherein the descending tube is connected to the geyser channel in series and an arrangement where the geyser channel is concentrically located inside the descending tube.

17. The apparatus of claim 14, wherein the U-shaped pipe arrangement consists of a descending tube and a geyser channel and wherein the U-shaped pipe arrangement is selected from the group consisting of an arrangement wherein the descending tube is connected to the geyser channel in series and an arrangement where the geyser channel is concentrically located inside the descending tube.

18. The apparatus of claim 15, wherein the aforementioned group of valves comprises at least a first valve installed in the common discharge pipe between said one end thereof and the U-shaped pipe arrangement, a second valve installed in said descending pipe, and a third valve installed in a section of the common discharge pipe between the descending pipe and the geyser channel.

19. The apparatus of claim 16, wherein the aforementioned group of valves comprises at least a first valve installed in the common discharge pipe between said one end thereof and the U-shaped pipe arrangement, a second valve installed in said descending pipe, and a third valve installed in a section of the common discharge pipe between the descending pipe and the geyser channel.

20. The apparatus of claim 17, wherein the aforementioned group of valves comprises at least a first valve installed in the common discharge pipe between said one end thereof and the U-shaped pipe arrangement, a second valve installed in said descending pipe, and a third valve installed in a section of the common discharge pipe between the descending pipe and the geyser channel.

21. The apparatus of claim 19, further comprising a fourth valve in the steam pipe.

22. The apparatus of claim 20, further comprising a fourth valve in the steam pipe.

* * * * *